US012789025B2

(12) United States Patent
Bingham Roy et al.

(10) Patent No.: US 12,789,025 B2
(45) Date of Patent: Nov. 10, 2026

(54) RESPIRATOR MASK

(71) Applicant: AirBoss Defense Group LLC, Jessup, MD (US)

(72) Inventors: Ian Garth Bingham Roy, Washington, DC (US); Daren Wayne Olsen, New Market, MD (US); Kevin Fedarcyk, Gambrills, MD (US); Stefan Swan, Bowie, MD (US)

(73) Assignee: AirBoss Defense Group LLC, Jessup, MD (US)

(*) Notice: Subject to any disclaimer, the term of this patent is extended or adjusted under 35 U.S.C. 154(b) by 1059 days.

(21) Appl. No.: 17/519,510

(22) Filed: Nov. 4, 2021

(65) Prior Publication Data

US 2023/0137526 A1 May 4, 2023

(51) Int. Cl.

*A62B 23/02* (2006.01)
*A41D 13/11* (2006.01)
*A62B 18/02* (2006.01)

(52) U.S. Cl.

CPC .............. *A62B 23/02* (2013.01); *A41D 13/11* (2013.01); *A41D 13/1161* (2013.01); *A41D 13/1184* (2013.01); *A62B 18/025* (2013.01)

(58) Field of Classification Search

CPC ....... A62B 18/025; A62B 18/00; A62B 18/02; A62B 18/08–088; A62B 19/00; A62B 23/00–04; A41D 13/11; A41D 13/1161; A41D 13/1184; A61M 16/105–107; A61M 16/0087–0093
USPC ........................... 128/205.29, 206.11–206.17
See application file for complete search history.

(56) References Cited

U.S. PATENT DOCUMENTS

| | | | | |
|---|---|---|---|---|
| 1,317,947 | A * | 10/1919 | Soderling | A62B 23/02 128/206.17 |
| 10,945,469 | B1 * | 3/2021 | Rosenberg | A62B 18/08 |
| 10,974,084 | B1 * | 4/2021 | Grinvald | A62B 18/025 |
| 2005/0109343 | A1 * | 5/2005 | Flanningan | B29C 45/0062 128/206.17 |
| 2007/0144123 | A1 * | 6/2007 | Angadjivand | A62B 23/02 55/486 |
| 2021/0275841 | A1 * | 9/2021 | Conrad | B03C 3/32 |
| 2023/0181943 | A1 * | 6/2023 | Lurie | B01D 46/0028 128/858 |
| 2024/0008568 | A1 * | 1/2024 | Nguyen | A41D 13/1184 |
| 2024/0252852 | A1 * | 8/2024 | Chelak | A62B 23/025 |

* cited by examiner

*Primary Examiner* — Brandy S Lee
*Assistant Examiner* — Kelsey Rhee
(74) *Attorney, Agent, or Firm* — Tanner IP, PLLC

(57) ABSTRACT

Two-way filtering, non-valved, half-mask respirators are described in which a framework of polypropylene, or other relatively rigid, components provide structure and mounting points to the mask, thereby distributing mounting tension to a pliable inner seal. The rigid components also provide a hard port to allow for sealing pressure to receive a filter canister or container, while the pliable inner seal allows the mask to conform to the users face.

19 Claims, 16 Drawing Sheets

RESPIRATOR MASK

BACKGROUND OF THE INVENTION

The present subject matter generally relates to two-way filtering, non-valved, half-mask respirators.

The critical importance of two-way filtering respirators has become an international concern during the COVID-19 pandemic, during which most countries around the world have implemented various mask requirements. Two-way respirator masks are distinguished from other types of respirators in that both the inhaled ambient air and the exhaled air are filtered, in order to protect both the wearer and those around the wearer from possible pathogens.

Current masks may generally include filtering facepiece respirators (e.g., N95, surgical, or other cloth and woven masks), half-mask respirators, and full-face masks/hoods. However, each of these categories of masks have distinct drawbacks when considering, for example, the combination of effectiveness, reusability, ease of use, comfort, and/or cost of the differing designs. For example, while N95/cloth masks are relatively inexpensive, they suffer from numerous drawbacks in overall effectiveness (e.g. due to poor fit, filter efficacy, etc.), lack of reusability and increased waste, and difficult to control fogging of eyeglasses and/or face shields. On the other end of the spectrum, full face masks/hoods are expensive, difficult to use, and uncomfortable for prolonged wear.

The present subject matter provides benefits to effectiveness, reusability, ease of use, and/or comfort, in a relatively low-cost half-mask design, which can selectively accommodate accessories such as a removable face shield and/or various head harnesses.

BRIEF SUMMARY OF THE INVENTION

According to first aspects of the disclosure, a two-way respirator mask may be provided including one or more of a face portion including an outer housing, a cheek portion integrally formed with the outer housing, and a filter container attached to the face portion. In embodiments, the filter container may be configured to receive a filter cannister and may include a removable cover through which air may be inhaled and exhaled.

In embodiments, the cheek portion may include an attachment interface including a plurality of first holes configured to receive removable fittings and/or a plurality of second holes configured to receive straps therethrough.

Embodiments may include a removable face shield removably attached to the attachment interface via at least two removable fittings inserted in the first holes.

Embodiments may include a head harness removably attached to the attachment interface via at least four straps received through the second holes.

In embodiments, the filter container may include an airway through which air may be inhaled through the filter cannister and exhaled through the filter cannister.

In embodiments, the face portion may include an inner seal at least partially within the outer housing.

In embodiments, the inner seal or the outer housing may be manufactured from a different material than the attachment interface, e.g., such that the inner seal or outer housing is less rigid than the attachment interface.

In embodiments, the outer housing may be manufactured from a moldable material, which may be molded to at least one of the filter container, the attachment interface, or other rigid framework.

Embodiments may include a gap between the inner seal and the cheek portion, whereby the inner seal can conform to a user's face without affecting a shape of the cheek portion.

In embodiments, the removable fittings may include one or more flared fittings configured to plug into the first holes.

In embodiments, the head harness may include a cap portion connected to the straps, and configured to rest atop a user's head and/or to distribute tension from the straps across an area of the cap portion.

In embodiments, the cap portion may include a hole sized to accommodate a user's hair, e.g. a ponytail, therethrough.

Embodiments may include a single replaceable filter, and the assembled respirator mask including the filter canister may provide a filter efficiency of, for example, greater than 99.97% at 0.3 microns.

In embodiments, the assembled respirator mask including the filter canister may provide a filter resistance in a range of, for example, 14.0-15.0 mm$H_2O$.

According to further aspects of the disclosure, a two-way respirator mask may be provided including one or more of a face portion including an inner seal and an outer housing, a cheek portion integrally formed with the outer housing, and a filter container attached to the face portion. In embodiments, the filter container may be configured to receive a filter cannister and may include a removable cover through which air may be inhaled and exhaled.

In embodiments, the filter container may include an airway through which air may be inhaled through the filter cannister and exhaled through the filter cannister In embodiments, the cheek portion may include an attachment interface.

In embodiments, the attachment interface may include a plurality of fixed holes configured to receive at least one of removable fittings or straps.

In embodiments, the outer housing may be manufactured from a moldable material, which may be molded to at least one of the filter container or the attachment interface.

In embodiments, the attachment interface may be manufactured from a material that is more rigid than the material of the outer housing.

In embodiments, the filter container may be manufactured from a material that is more rigid than the material of the outer housing.

Embodiments may include a gap between the inner seal and the cheek portion, whereby the inner seal can conform to a user's face without affecting a shape of the cheek portion.

In embodiments, the attachment interface may include a plurality of fixed holes configured to receive removable fittings and straps.

Embodiments may include a face shield removably attached to the attachment interface via removable fittings.

Embodiments may include a head harness removably attached to the attachment interface via straps woven through the fixed holes.

Embodiments may include the filter cannister, and the assembled respirator mask including the filter canister may provide a filter efficiency of greater than, for example, 99.97% at 0.3 microns.

In embodiments, the assembled respirator mask including the filter canister may provide a filter resistance in a range of, for example, 14.0-15.0 mm$H_2O$.

According to further aspects of the disclosure, methods of manufacturing a two-way respirator mask may include one or more of providing a rigid cheek portion and a rigid filter container, and molding a pliable material to the rigid cheek portion and the rigid filter container to form the two-way respirator mask. In embodiments, the method may include providing two rigid cheek portions, disposed on opposite sides of the mask, and a rigid filter container between the two cheek portions, and molding the pliable material to the rigid cheek portions and the rigid filter container to form the two-way respirator mask.

In embodiments, the pliable material may be molded to the rigid cheek portion(s) and the rigid filter container substantially simultaneously.

In embodiments, the rigid cheek portion(s) may include an attachment interface including a plurality of first holes configured to receive removable fittings and/or a plurality of second holes configured to receive straps therethrough.

Embodiments may include providing a removable face shield removably attached to the attachment interface via at least two removable fittings inserted in the first holes.

Embodiments may include providing a head harness removably attached to the attachment interface via at least four straps received through the second holes.

In embodiments, the filter container may include an airway through which air may be inhaled through the filter cannister and exhaled through the filter cannister.

In embodiments, the pliable material may be molded to form an outer portion, which is exposed when the mask is worn, and an inner seal configured to contact a user's face when the mask is worn.

In embodiments, at least part of the outer portion and at least part of the inner seal may overlap each other as separate layers of material. In embodiments, an air gap may be provided between at least part of the outer portion and at least part of the inner seal.

In embodiments, the outer portion and the inner seal may be molded as different thicknesses of the same material. In embodiments, at least part of the inner seal may be folded inward, such that an air gap is provided between overlapping portions of the inner seal.

In embodiments a gap may be included between the inner seal and the cheek portion(s), whereby the inner seal can conform to a user's face without affecting a shape of the cheek portion.

In embodiments, the removable fittings may include one or more flared fittings configured to plug into the first holes.

In embodiments, the head harness may include a cap portion connected to the straps, and configured to rest atop a user's head and/or to distribute tension from the straps across an area of the cap portion.

In embodiments, the cap portion may include a hole sized to accommodate a user's hair, e.g. a ponytail, therethrough.

Embodiments may include a single replaceable filter, and the assembled respirator mask including the filter canister may provide a filter efficiency of, for example, greater than 99.97% at 0.3 microns.

In embodiments, the assembled respirator mask including the filter canister may provide a filter resistance in a range of, for example, 14.0-15.0 $mmH_2O$.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings.

DETAILED DESCRIPTION OF THE INVENTION

Figure 1:
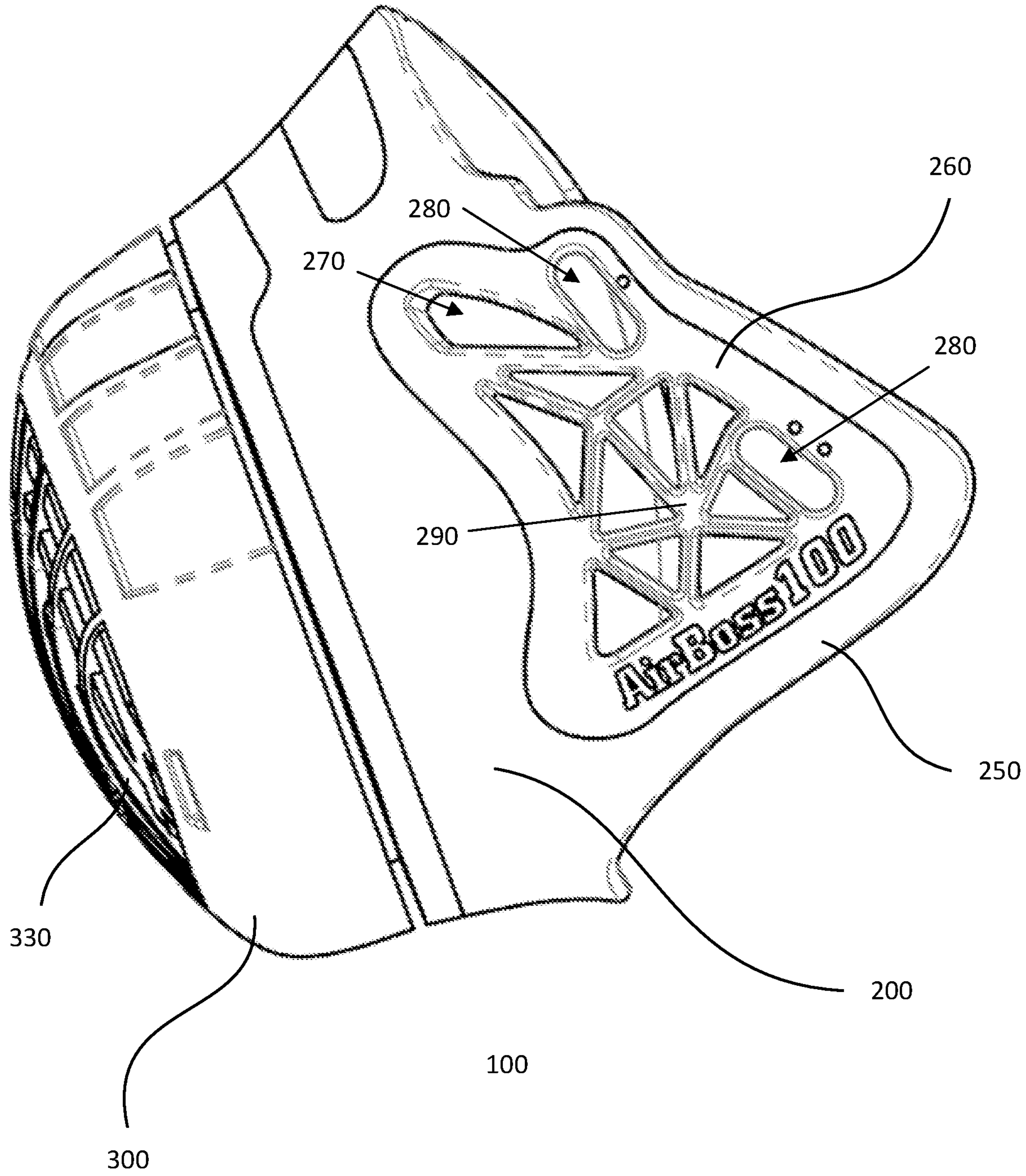
FIG. 1 is a side view of an exemplary respirator mask according to aspects of the disclosure.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a strap" is a reference to one or more straps and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

FIG. 1 is a side view of exemplary respirator mask 100 according to aspects of the disclosure. As shown in FIG. 1, the respirator mask 100 includes a face portion 200 adjoining a cheek area 250. The face portion 200 may be generally understood as the part of the mask between the cheek portion 250, which covers a user's cheek area, and the filter container 300. As discussed further below, the face portion 200 of the mask 100 may include an outer housing, as well as an inner seal that is configured to conform to a user's face, providing a seal from the ambient air surrounding the user's mouth and nose. Thus, inhalation and exhalation through the mask are limited to a two-way airway through the grill 330 via a filter, as discussed further below.

As also shown in FIG. 1, the respirator mask 100 further includes an attachment interface 260 disposed in the area of the cheek portion 250. The attachment interface 260 may be manufactured from a relatively rigid material, such as plastic, in order to provide stability for various attachments, such as a face shield and/or a head harness. This rigidity may be maintained even when removing portions of material to form a lattice 290, which can reduce the overall weight of the mask 100, and provide ventilation benefits around the inner portions of mask 100. The relative rigidity of the attachment interface 260 may also provide benefits in the overall effectiveness and comfort of the mask, such as by reducing deformation of the mask under loads and reducing the direct pressure felt on the user's face.

The attachment interface 260 may include a first hole 270, which is configured to receive a complimentary fitting (e.g., a plug) to allow stable attachment of a face shield. The attachment interface 260 may also include second holes 280, which are configured to receive one or more straps therethrough, which can be used to attach lightweight head straps, or a more robust head harness. Securing neck and/or head straps to the relatively rigid attachment interface 260 helps to provide a more uniform pressure to the underlying inner seal 220, which is relatively flexible and could be undesirably deformed if subjected to directional tension from the straps.

The attachment interface 260 and/or the filter container 300 may be manufactured from a relatively rigid material, such as plastic, e.g., Random clarified Copolymer Polypropylene (RCoPP 35C) which has a Rockwell Hardness of 112, whereas the outer housing 210 and/or the inner seal 220 may be formed of a relatively less rigid material, such as an elastomer, e.g., SANTOPRENE™ 8281-35, which has a Shore A Hardness of 39. The outer housing 210 and/or the inner seal 220 may be molded to the attachment interface 260 and/or the filter container 300.

Figure 2A:
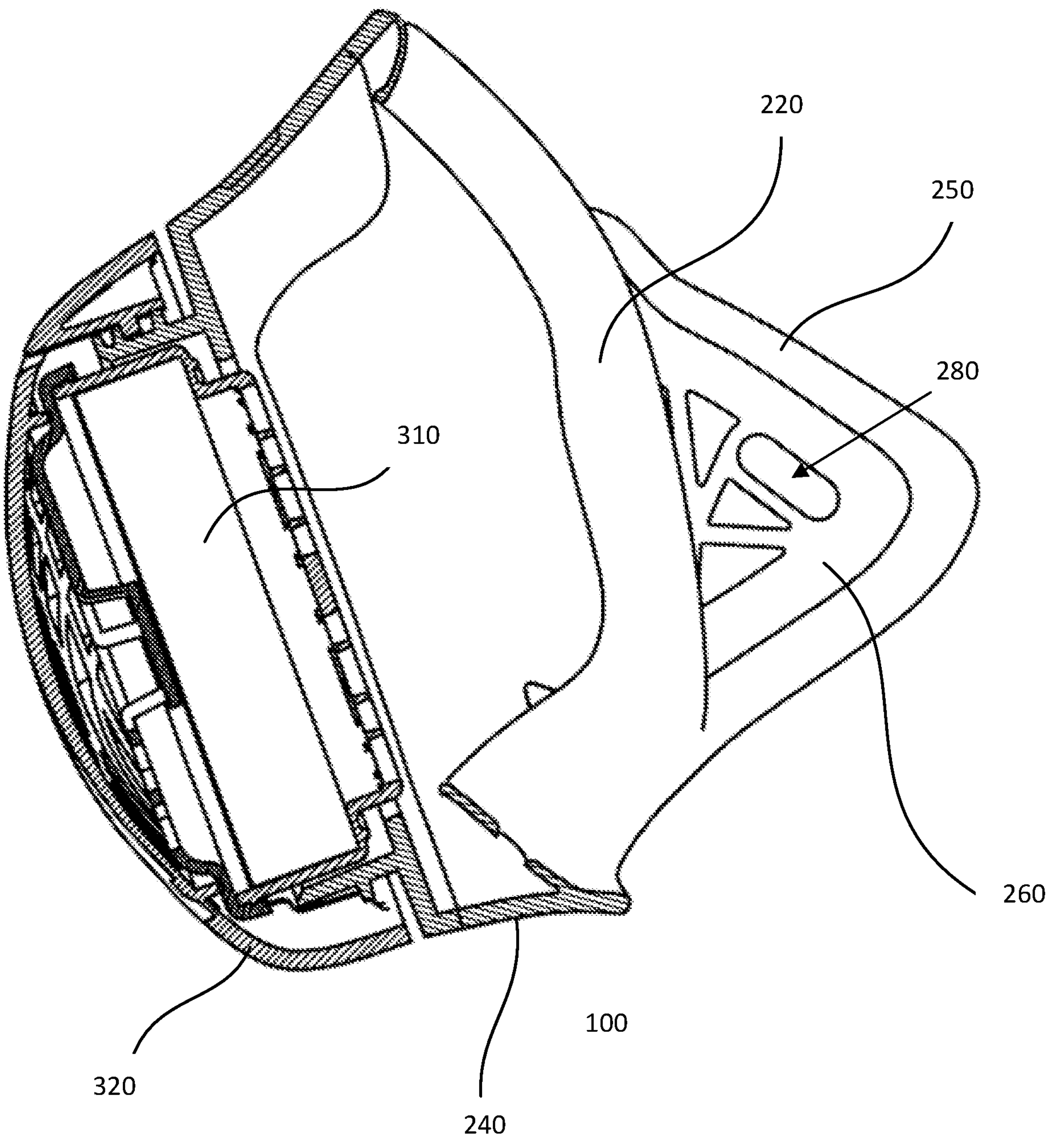
FIG. 2A is a cross sectional view of the exemplary respirator mask shown in FIG. 1.

FIG. 2A is a cross sectional view of the respirator mask 100 shown in FIG. 1. As shown in FIG. 2, the filter container 300 may include a removable cover 320 that is used to insert, or gain access to, the filter cannister 310. As noted above, the filter container 300 and removable cover 320 may be formed of a relatively rigid material, such as plastic, to securely hold and protect the filter cannister 310, and withstand repeated changing of the filter cannister. The filter container 300 may further include a base 240, which is provided with an airway hole through which air can be exchanged, and to which the outer housing and/or inner seal of the face portion 200 may be molded.

As also shown in FIG. 2A, the cheek portion 250 and attachment interface 280 may extend rearward of the inner seal 220.

Figure 2B:
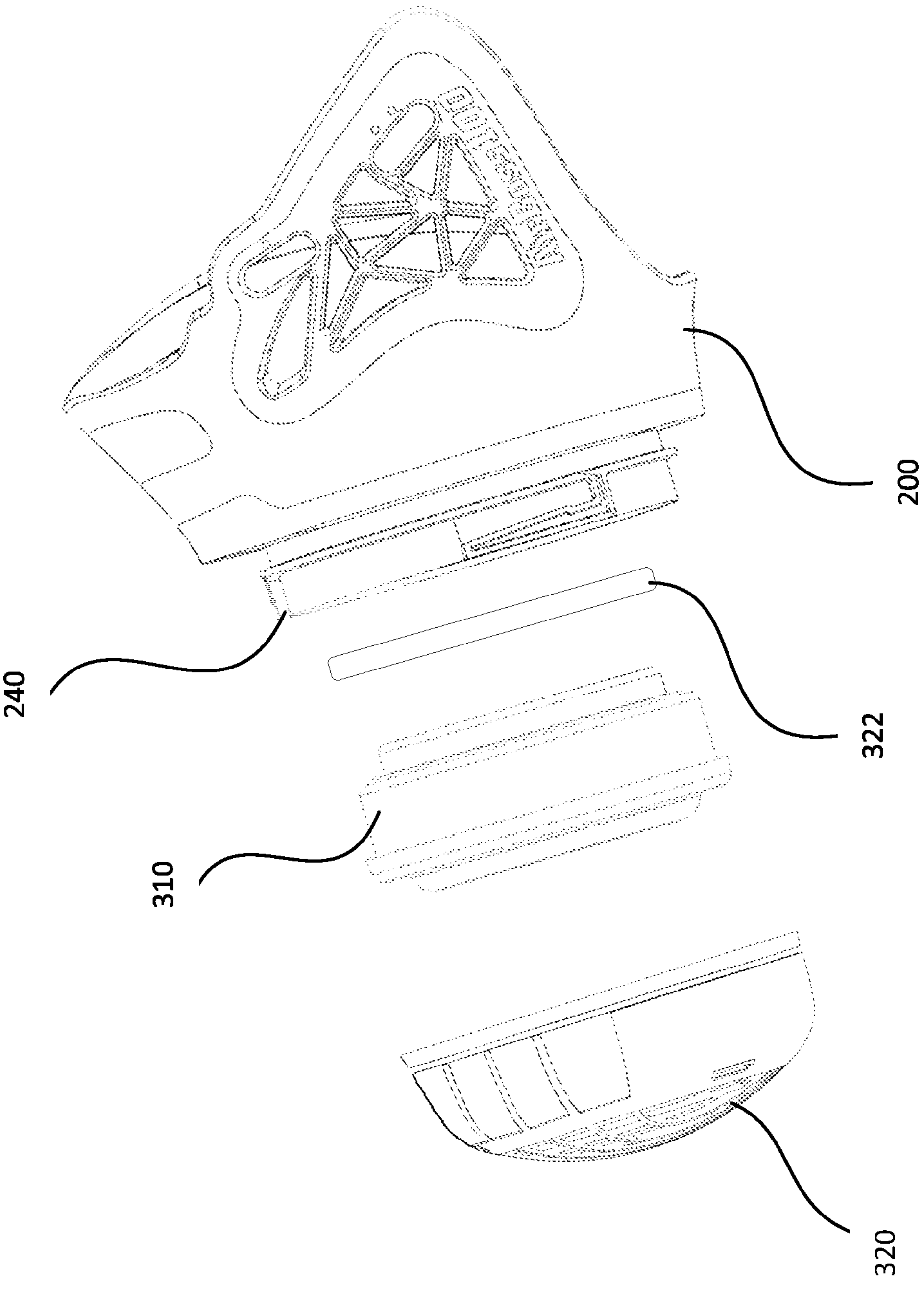
FIG. 2B is a partially exploded side view of certain component parts of the exemplary respirator mask shown in FIG. 1.

FIG. 2B is an exploded side view of certain component parts of the respirator mask 100 shown in FIG. 1. As shown in FIG. 2B, the filter container 300 may include the removable cover 320 and the base 240, which includes a mounting portion for the removable cover 320. The removable cover 320 and/or the base 240 may be formed of a relatively rigid material, such as plastic. In this example, the removable cover 320 is configured to lock on to the mounting portion of the base 240 by pressing and rotating the removable cover 320. The filter cannister 310 may thus be secured within the removable cover 320 and the base 240. This configuration may be understood as a bayonet-style interface, which provides compression of the filter to a filter gasket 322 (which may be replaceable and surround the airway hole within base 240) in order to create an effective seal for forcing air through the filter. The bayonet design may use an approximate quarter turn rotation for simplified installation and removal.

Figure 3:
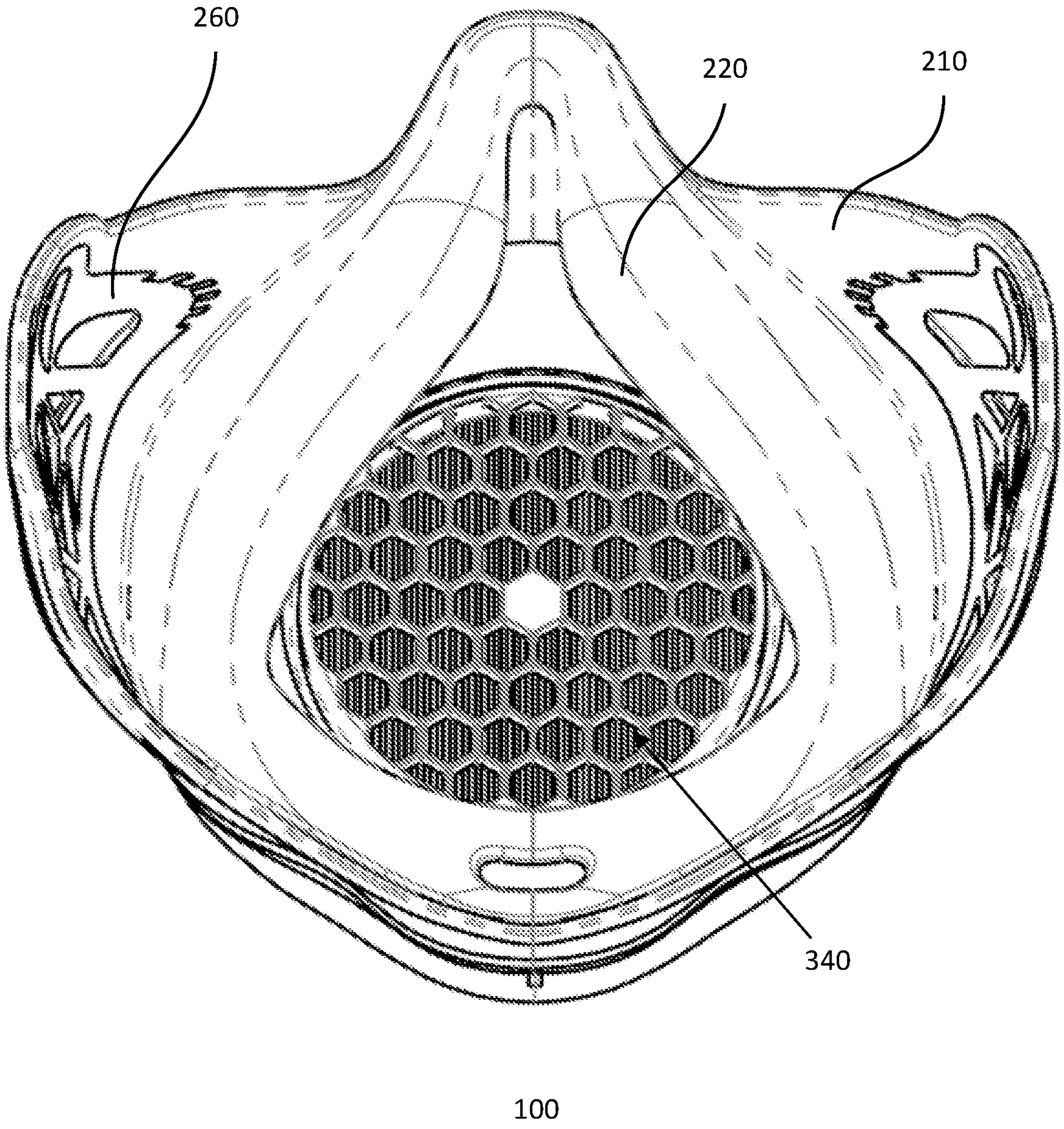
FIG. 3 is a rear view of the exemplary respirator mask shown in FIG. 1.

FIG. 3 is a rear view of the respirator mask 100 shown in FIG. 1, and shows additional details of the interior of the mask. As shown in FIG. 3, the inner seal 200 may surround a two-way airway 340, which is in fluid communication with the filter cannister 310 and grill 330. Thus, a user can inhale and exhale through the filter cannister 310 while the mouth and nostrils are otherwise sealed from the ambient air by inner seal 220. In embodiments, the inner seal 220 may be manufactured from a relatively flexible material, such as a medical-grade elastomer. Such materials have been found to provide a reliable and comfortable seal when used in this design.

As also shown in FIG. 3, the attachment interface 260 may be disposed at least partially within the outer housing 210 and/or the cheek portion 250, e.g., by molding the outer housing and/or the cheek portion to the attachment interface 260 and/or base 240.

Figure 4A:
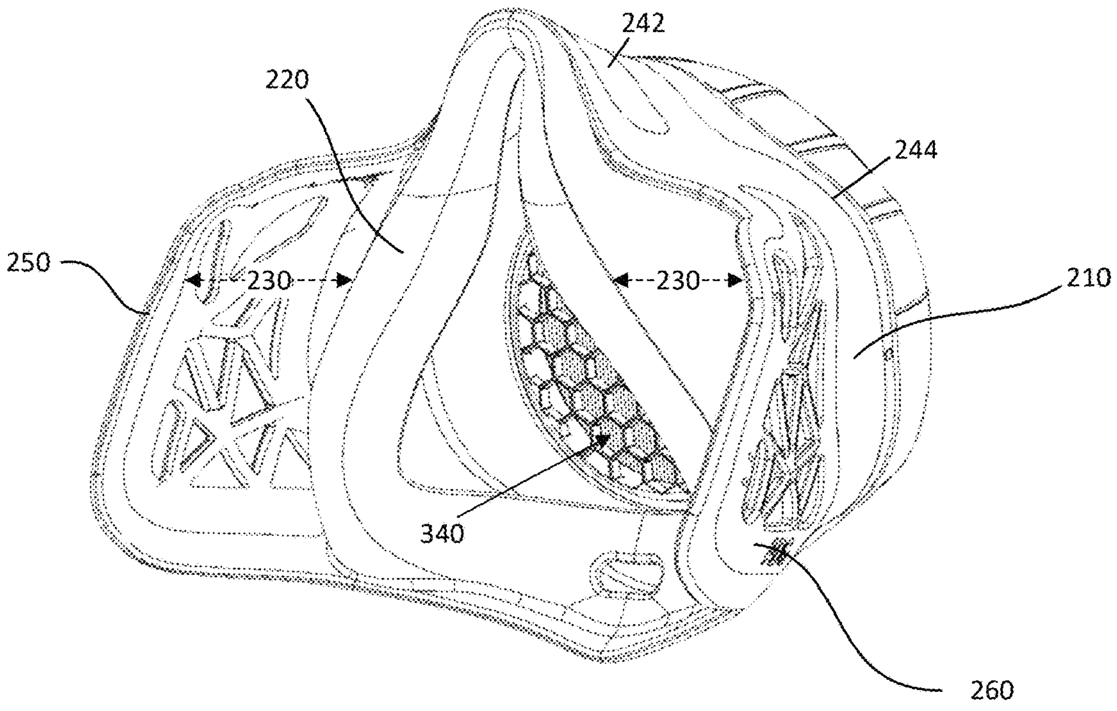
FIGS. 4A and 4B are isometric views of the exemplary respirator mask shown in FIG. 1, depicting additional details of the interior of the mask.
Figure 4B:
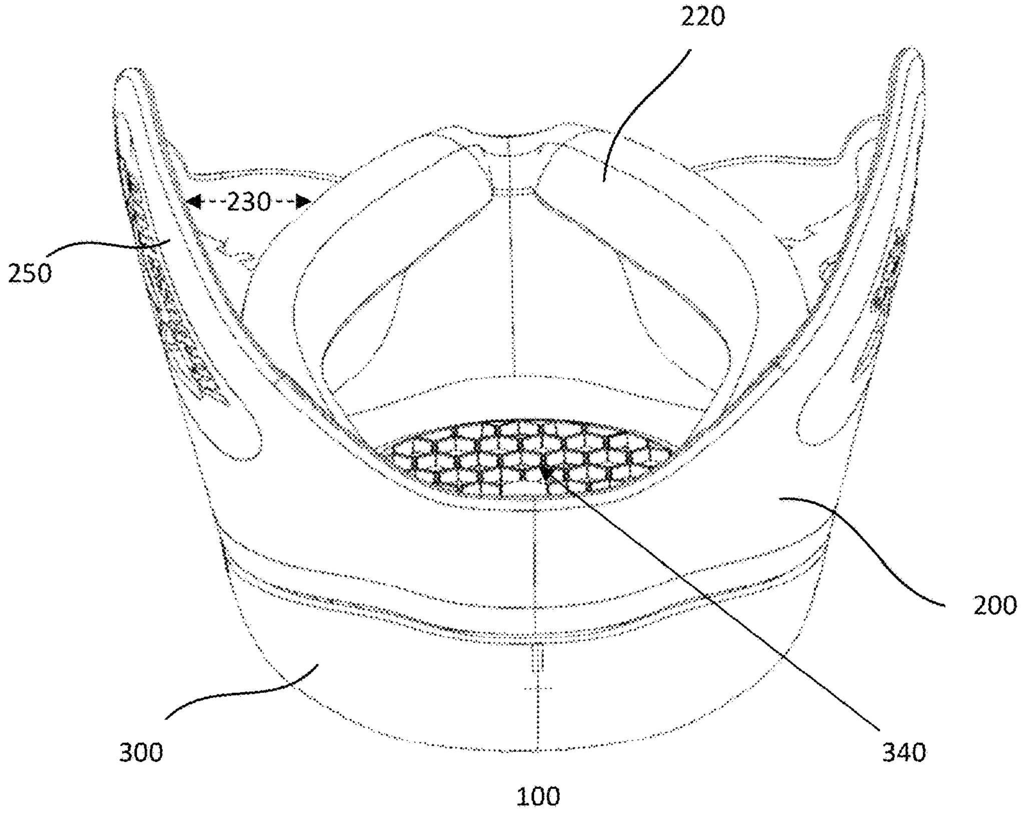

FIGS. 4A and 4B are isometric views of the exemplary respirator mask 100 shown in FIG. 1, depicting additional details of the interior of the mask. As shown in FIGS. 4A and 4B, the inner seal 220 and cheek portion 250 are configured such that a gap 230 exists between them. This gap allows, for example, the inner seal to conform to the face of a user without deforming the cheek portion. Similarly, tension can be applied to the attachment interface 260 without negatively affecting the fit of inner seal 220 around the user's nose and mouth.

FIG. 4A also depicts various interfaces between relatively rigid structural components of the mask 100 (e.g., attachment interface 260) and relatively pliable components, such as the inner seal 220. For example, the outer housing 210 may be molded to the base 240 along interface line 244. Base 240 may also include an extended portion 242 that provides relatively rigid structure at the top of the nose cavity, and which may be fully or partially surrounded by overmolded material of the outer housing 210.

In some examples, the outer housing 210 and the inner seal 220 may be formed of different pliable materials, or the outer housing 210 and the inner seal 220 may be formed of different thicknesses of the same pliable material. In either situation, the inner seal 220 may be relatively more pliable than the outer housing 210, thus improving the comfort and effectiveness of inner seal 220.

An opening 232 may be provided in the chin area of the inner seal 220 to support moisture removal, and/or improved conformance and comfort. The inner seal 220 may be shaped, e.g., molded, to fold within itself, such that there is a natural gap between overlapping portions of the inner seal. This design may provide improvements to fit and/or comfort, e.g., by reducing or eliminating material edges from directly contacting skin.

Figure 5:
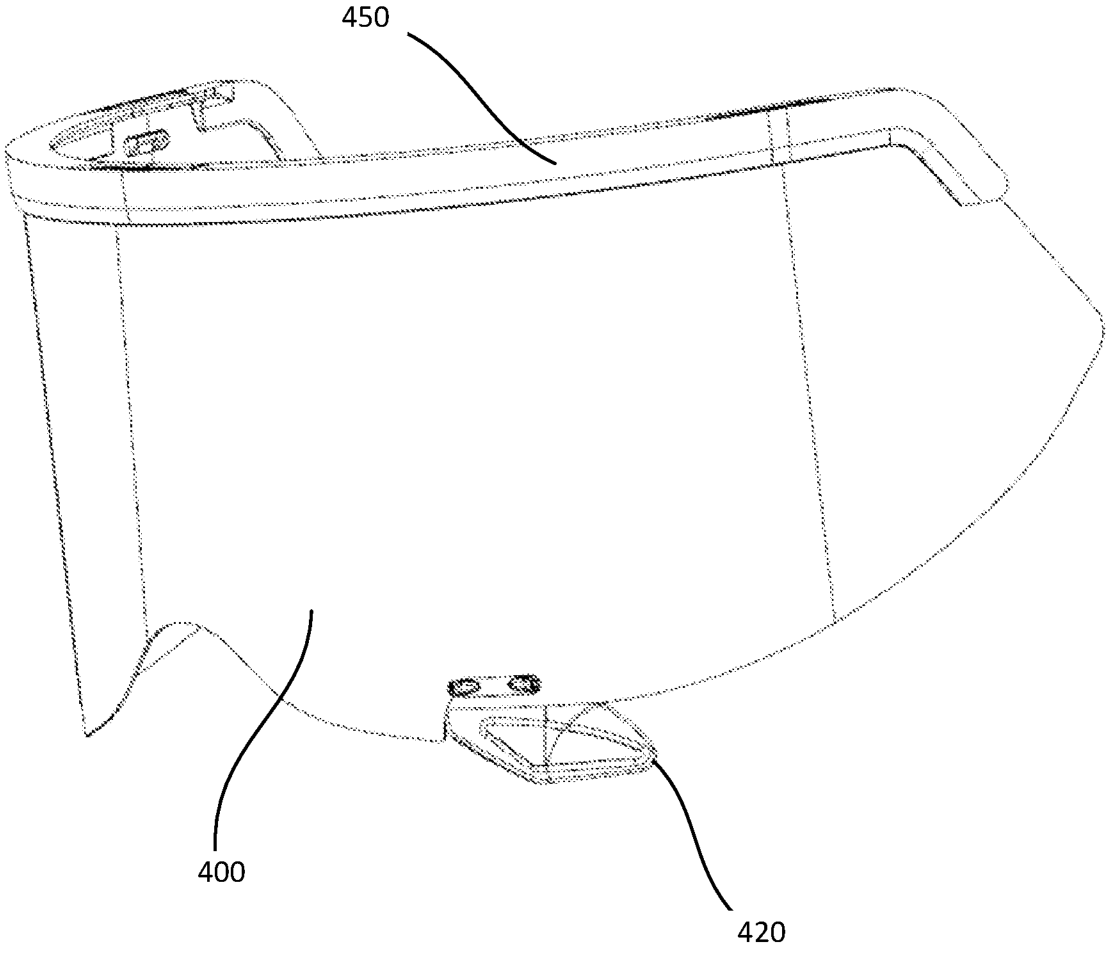
FIG. 5 is an isometric view of an exemplary face shield according to aspects of the disclosure.
Figure 6:
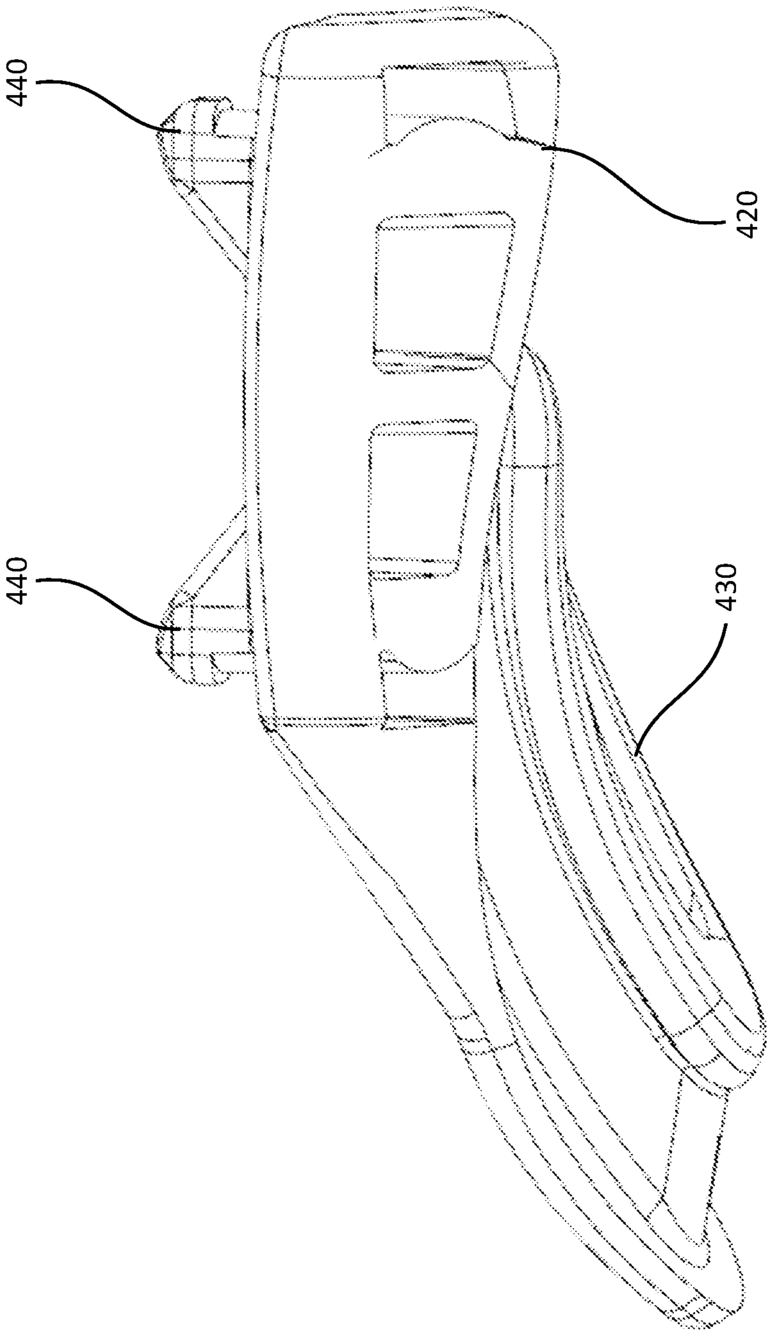
FIG. 6 depicts an exemplary face shield fitting according to aspects of the disclosure.

FIG. 5 is an isometric view of an exemplary face shield 400 according to aspects of the disclosure. Face shield 400 may be manufactured from known, relatively inexpensive materials, such as clear plastics, allowing for regular replacement of shields for use with a single respirator mask. The expense of such replacements can be further reduced through the use of removable brim 450 and fittings 420. As shown in FIG. 5, the face shield 400 may include a brim 450, which can be configured to maintain an overall curvature of the face shield, and, in some examples, may be removed and reused on a new face shield, e.g., if the face shield is scratched or otherwise unserviceable. Likewise, fittings 420, which are configured to attach the face shield 400 to respirator mask 100, can be removed from the face shield and reused. For example, as shown in FIG. 6, face shield fitting 420 may include a shield plug (in this case including two opposing prongs 440), which is configured to secure the fitting 420 to one or more holes in face shield 400, and a mask plug 430, which is configured to fit within first holes 270 in respirator mask 100 (as shown in FIG. 1).

Figure 7:
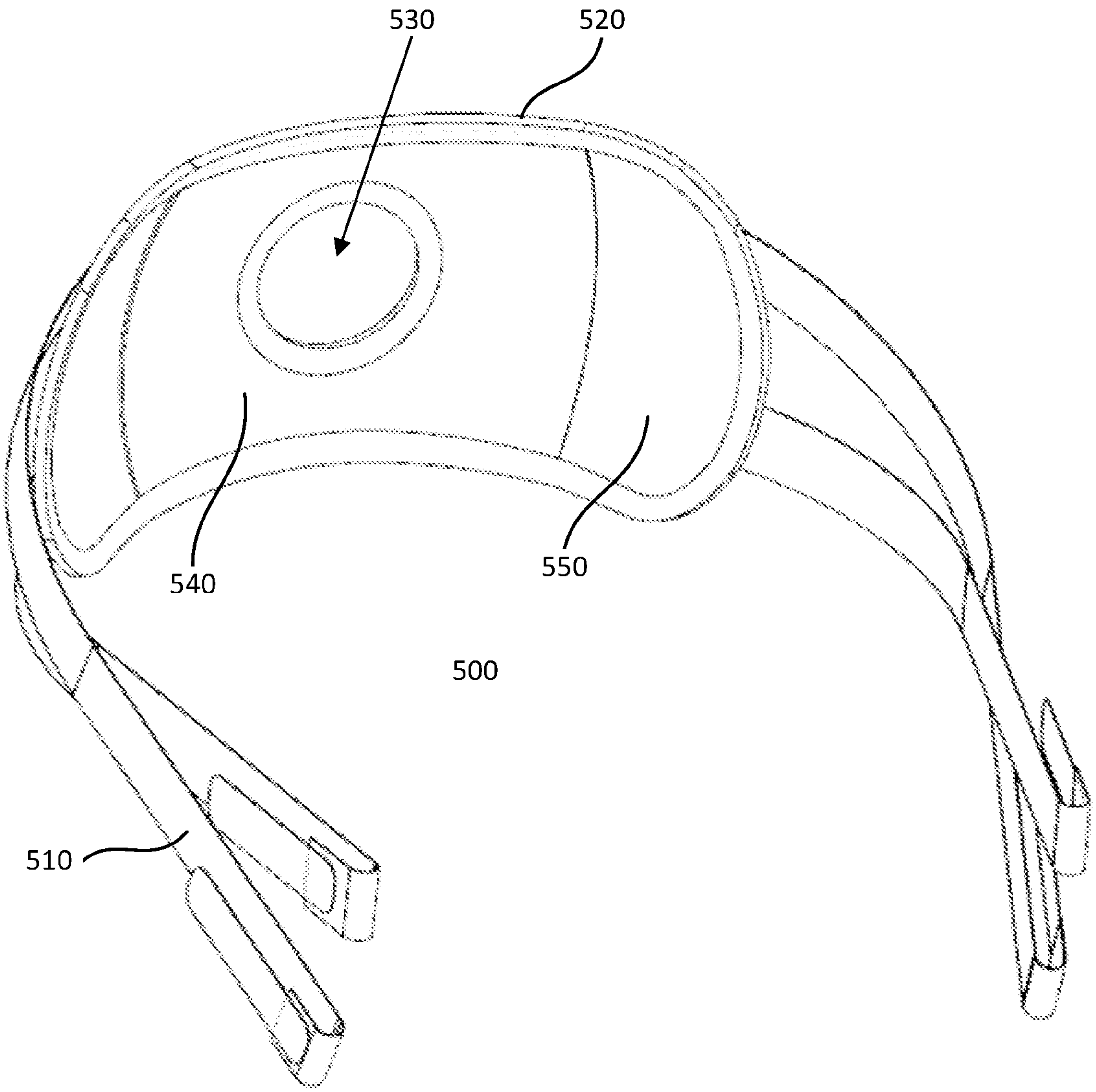
FIGS. 7 and 8 depict an exemplary head harness according to aspects of the disclosure.
Figure 8:
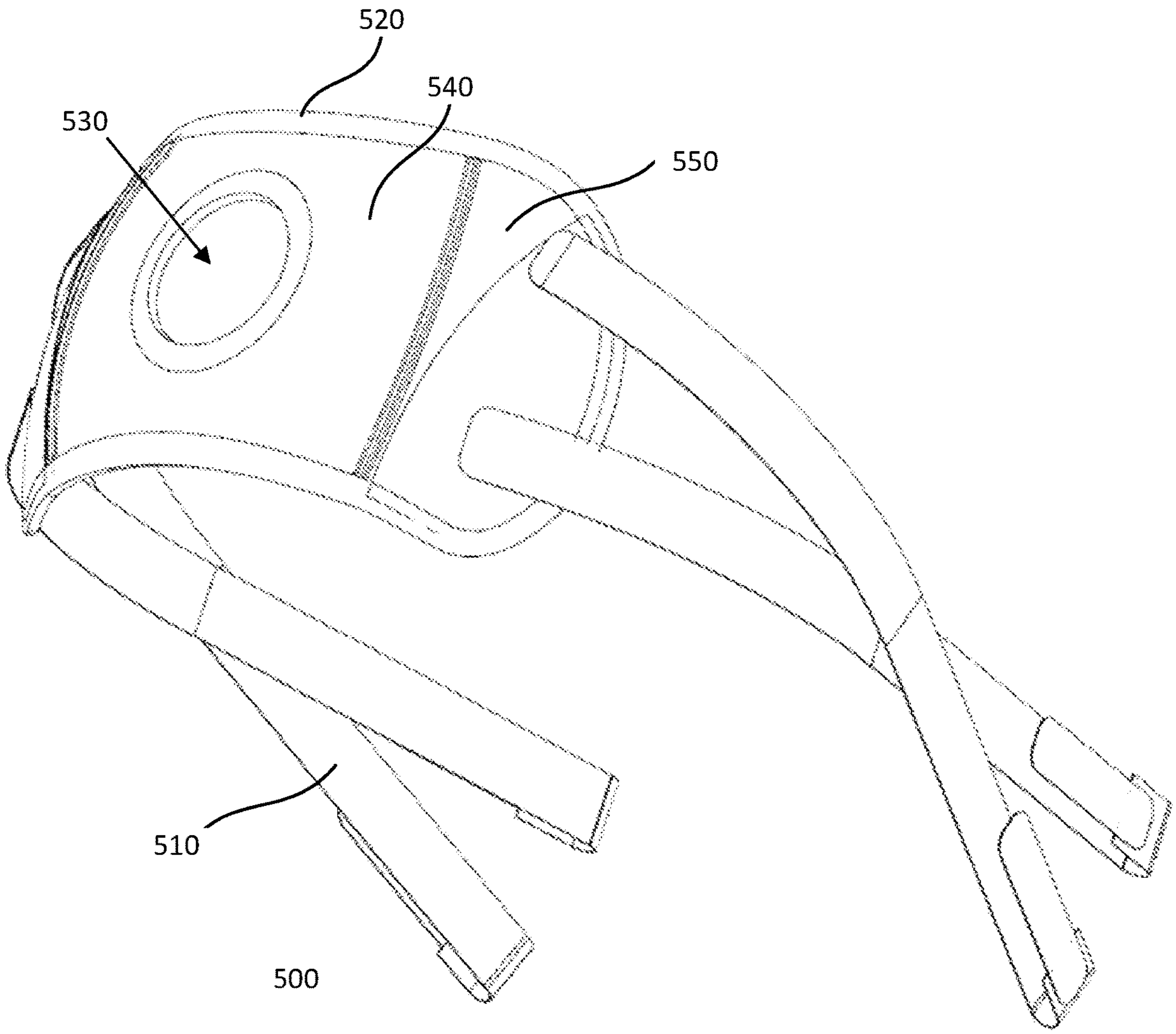

FIGS. 7 and 8 depict an exemplary head harness 500 according to aspects of the disclosure. As shown in FIGS. 7 and 8, the head harness 500 may include straps 510 and cap 520. Use of cap 520, which is configured to rest atop a user's head, can improve comfort of wearing respiratory mask 100, particularly for prolonged periods of time. For example, removing commonly used neck straps, and replacing them with a cap and straps can reduce the burden on the user. Cap 520 may include a number of features to further enhance comfort for a variety of users, such as hole 530, which is configured to allow a user's hair, such as a ponytail, to extend through. The cap 520 may be manufactured from a combination of different materials, such as elastic mesh 540, which provides improved ventilation and conformity, and a leather-like vinyl or similar material 550, which can provide a comfortable grip atop the user's head/hair.

Figure 9:
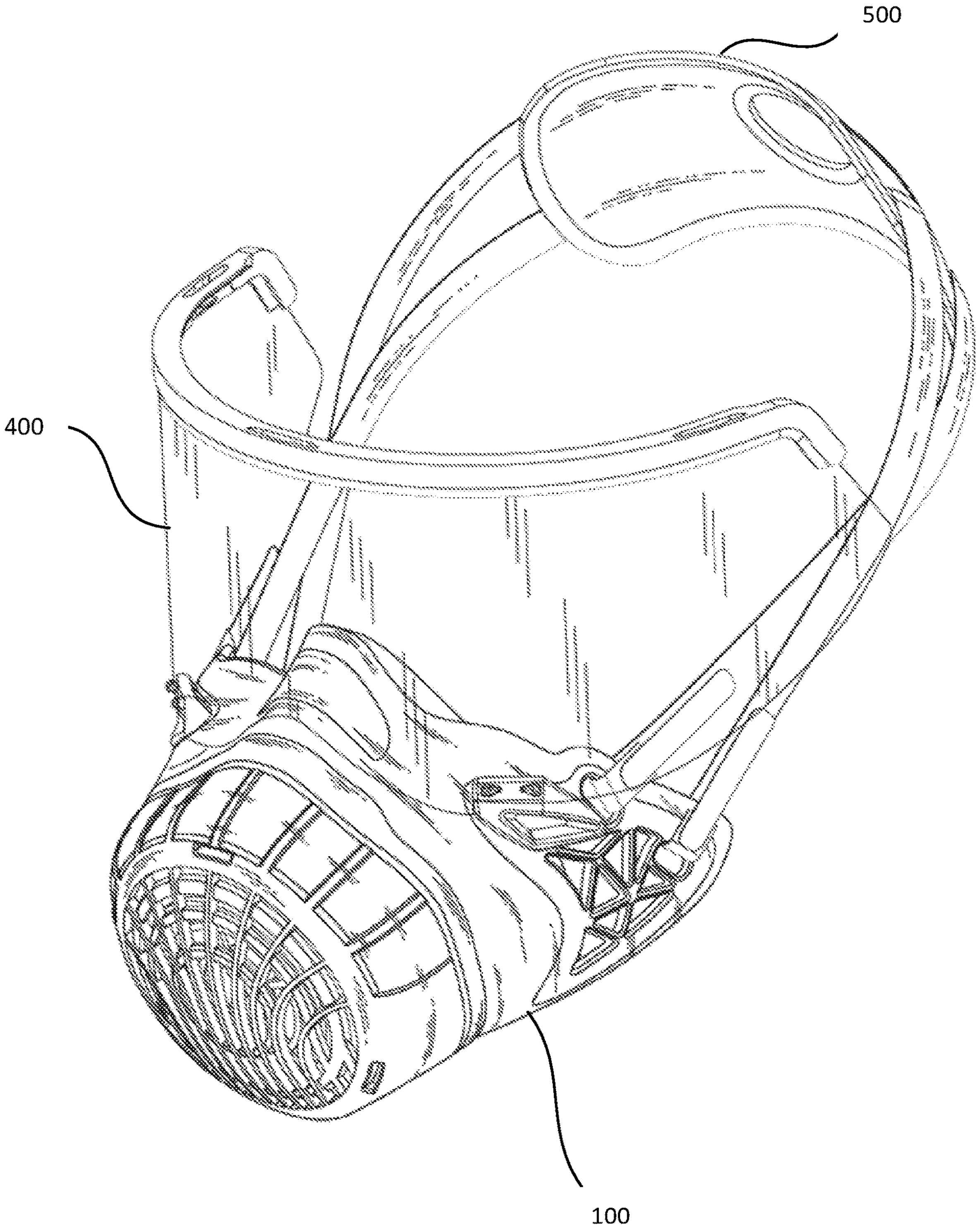
FIGS. 9-15 depict an exemplary respirator mask assembly, including a respirator mask, a face shield, and a head harness, from different views, according to aspects of the disclosure.

FIGS. 9-15 depict an exemplary respirator mask assembly 600, including a respirator mask 100, a face shield 400, and a head harness 500, from different views, according to aspects of the disclosure. As shown in FIG. 9, straps of the head harness 500 are wound through four fixed holes (e.g., second holes 280 depicted in FIG. 1) in a pair of attachment interfaces to secure the head harness to the mask 100. Face shield 400 is also attached to the pair of attachment interfaces via fittings (such as fitting 420 depicted in FIG. 6) inserted in fixed holes (e.g. first hole 270 depicted in FIG. 1). Accordingly, either or both of the head harness 500 and the face shield 400 may be removably secured to the respirator mask 100 via the pair of attachment interfaces.

Figure 10:
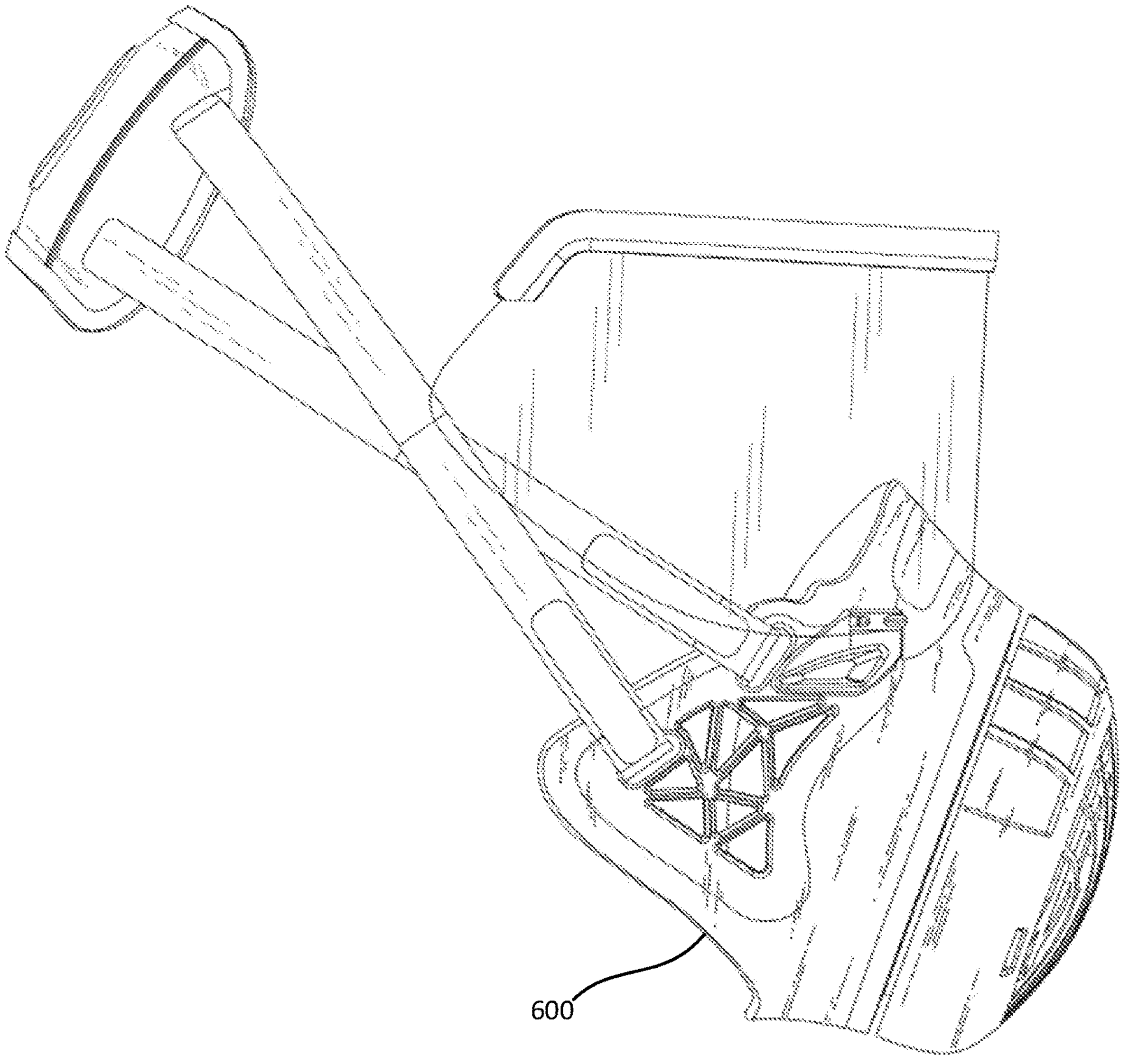

FIG. 10 is a right side elevation view of the respirator mask assembly 600, depicting exemplary details of the various attachments, and functional latticework of the attachment interface.

Figure 11:
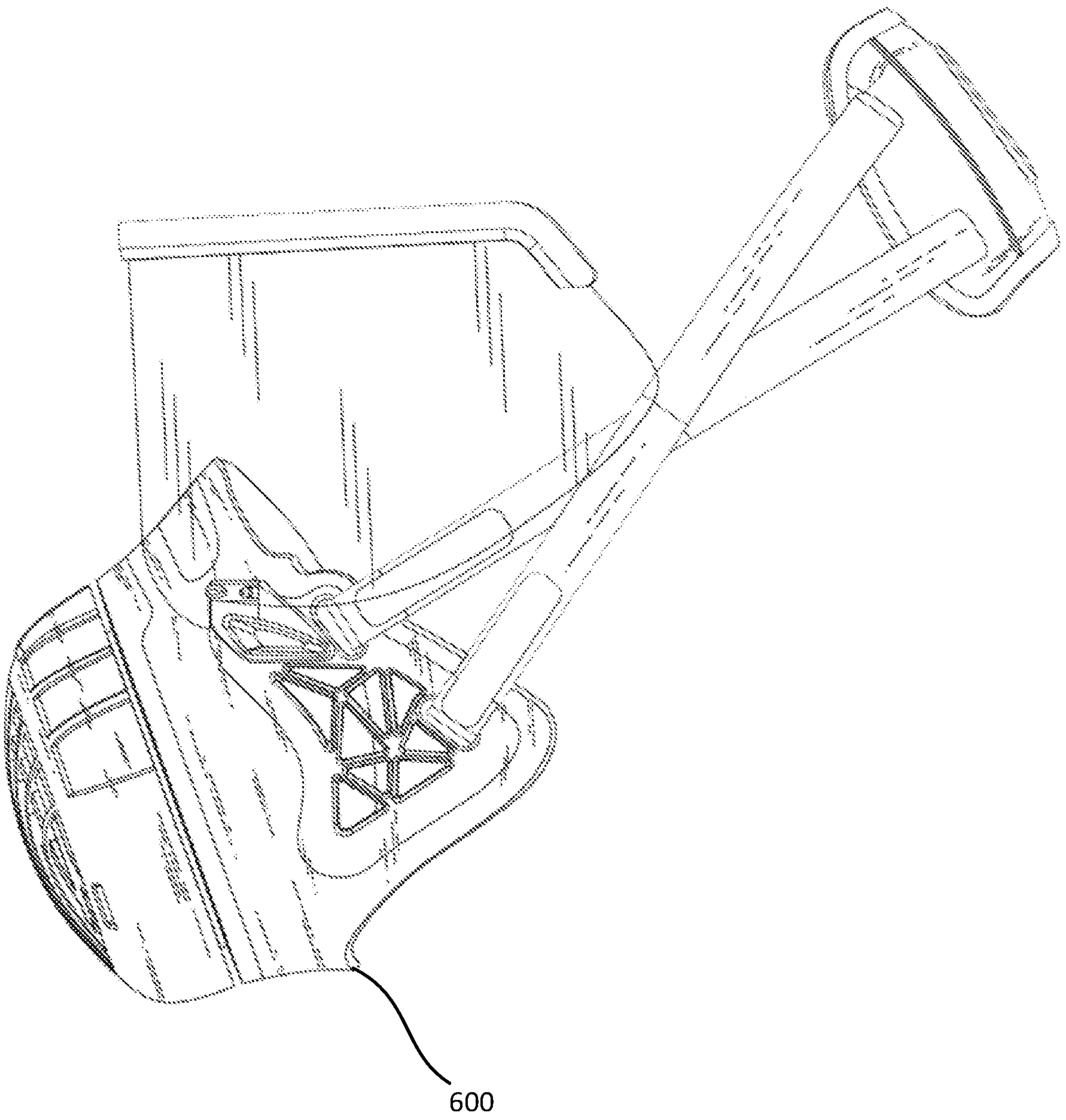

FIG. 11 is a left side elevation view of the respirator mask assembly 600, depicting exemplary details of the various attachments, and functional latticework of the attachment interface.

Figure 12:
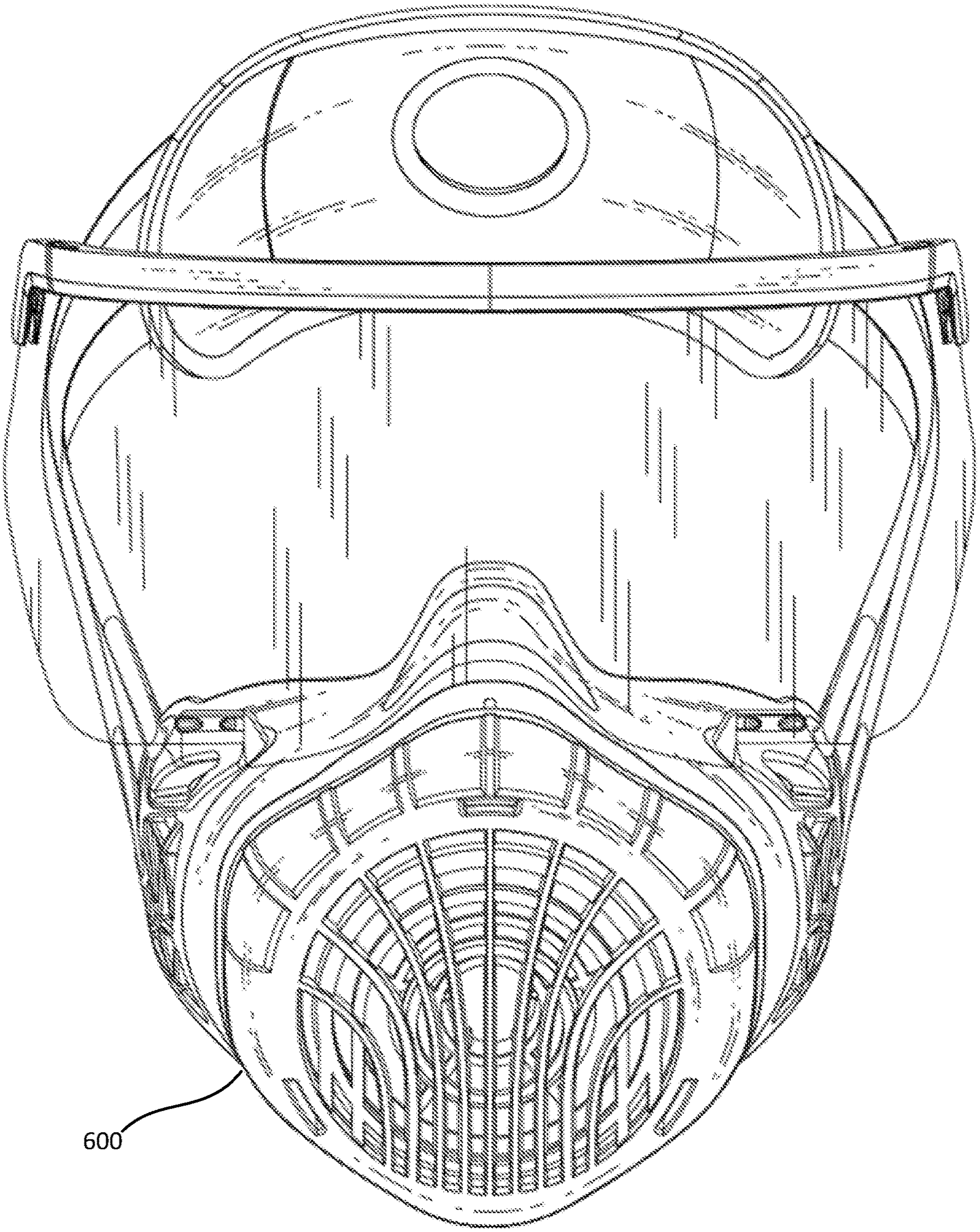

FIG. 12 is a front elevation view of the respirator mask assembly 600, depicting exemplary details of the removable cover and grill of the filter container and the face shield fittings.

Figure 13:
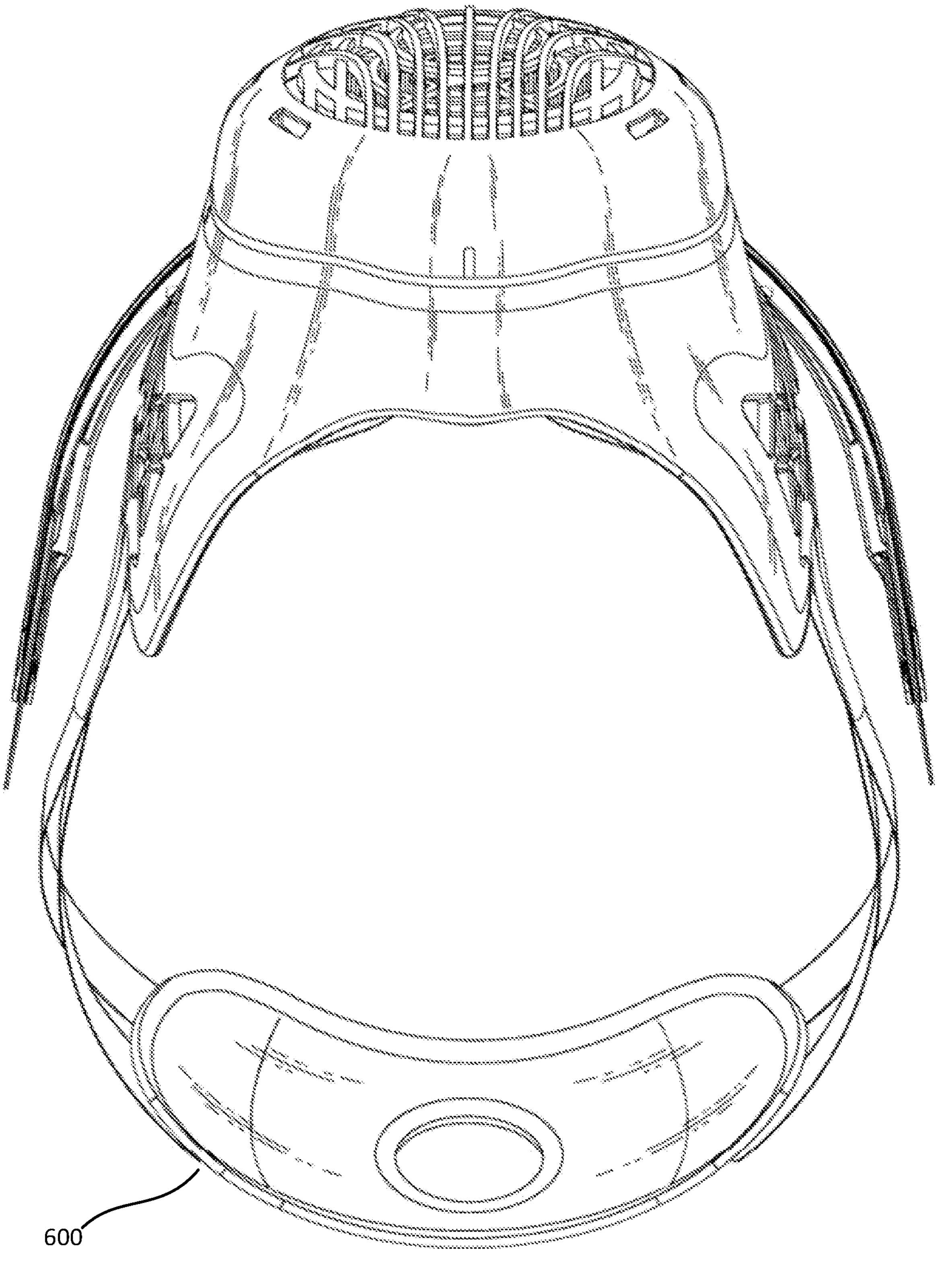

FIG. 13 is a bottom-up view of the respirator mask assembly 600, depicting exemplary details of the removable cover and grill of the filter container and the face shield.

Figure 14:
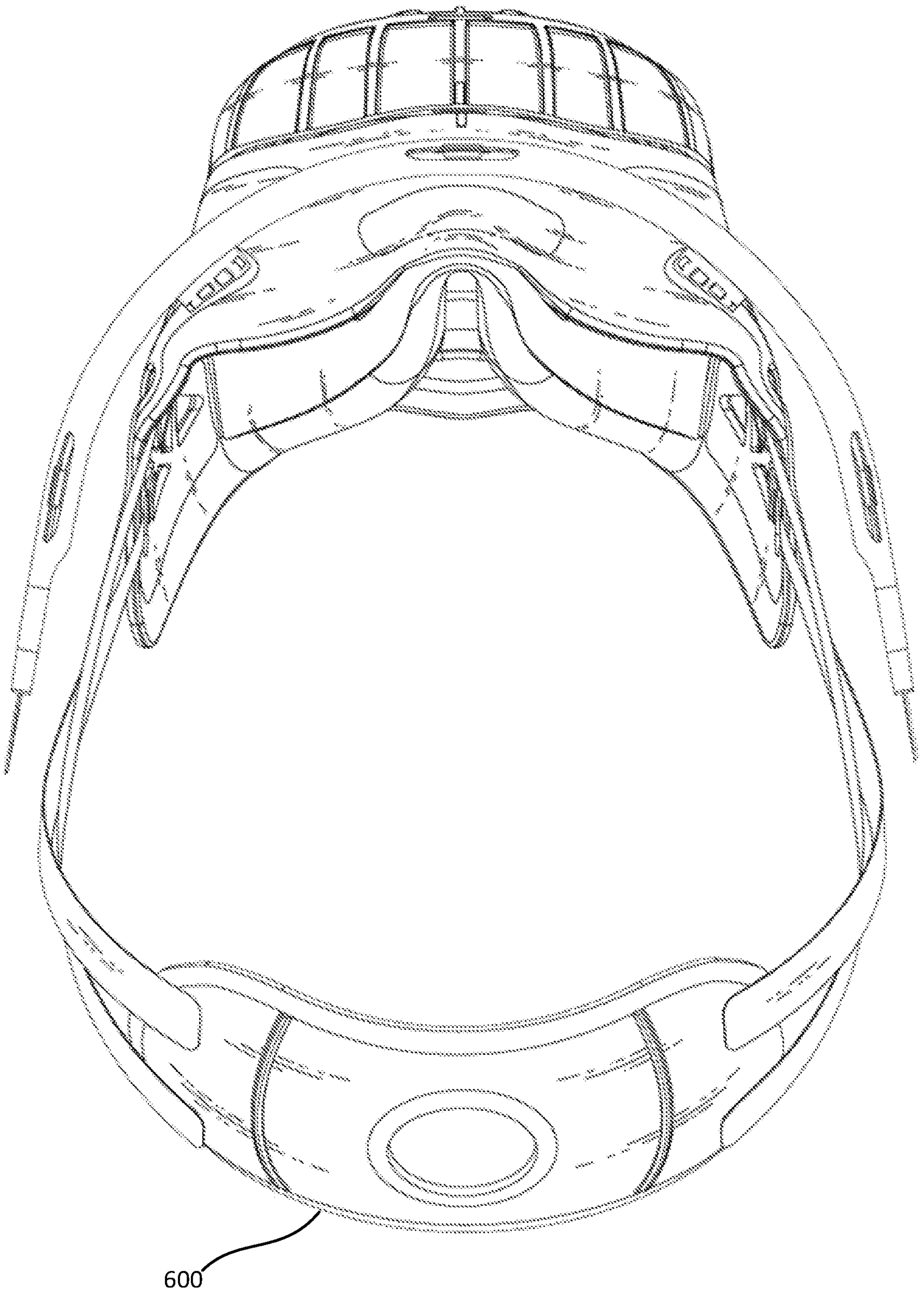

FIG. 14 is a top-down view of the respirator mask assembly 600, depicting exemplary details of the nose cup of the inner seal, which is nested within the outer housing, and the face shield.

Figure 15:
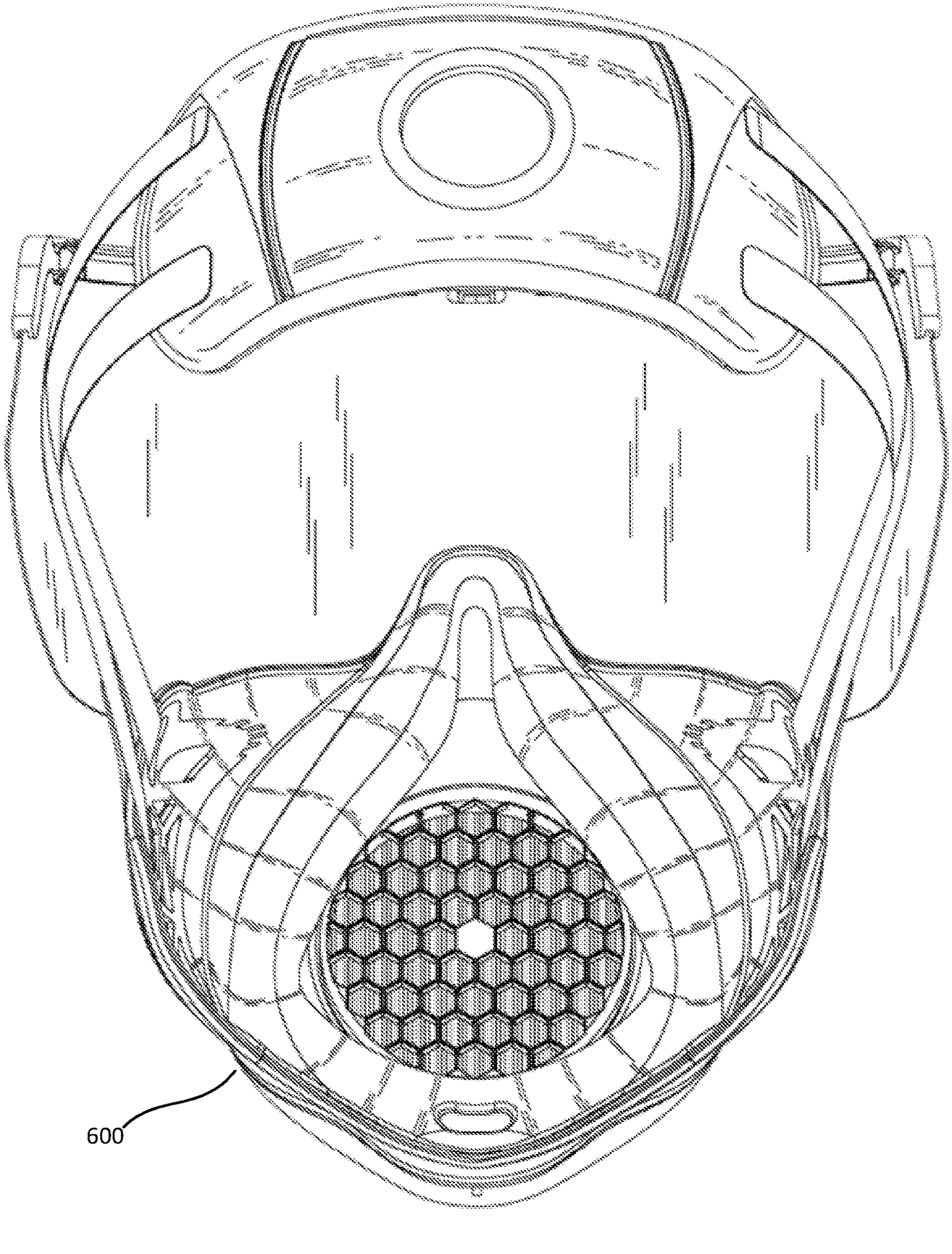

FIG. 15 is a rear elevation view of the respirator mask assembly 600, depicting exemplary details of the inner seal, two-way airway, and the head harness.

While various embodiments have been described above, it is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A two-way respirator mask, comprising:

a face portion including an outer housing;

a cheek portion integrally formed with said outer housing, said cheek portion including an attachment interface including a plurality of first holes configured to receive removable fittings and a plurality of second holes configured to receive straps therethrough;

a filter container attached to said face portion, said filter container configured to receive a filter cannister and including a removable cover through which air may be inhaled and exhaled;

a removable face shield removably attached to said attachment interface via at least two removable fittings inserted in said first holes; and a head harness removably attached to said attachment interface via at least four straps received through said second holes, wherein said filter container further includes an airway through which air may be inhaled through the filter cannister and exhaled through the filter cannister, wherein said outer housing is manufactured from a moldable material, and wherein said attachment interface is manufactured from a material that is more rigid than the material of said outer housing, and said attachment interface includes a left unitary cheek unit including at least one of said first holes and at least two of said second holes and a right unitary cheek unit including at least one of said first holes and at least two of said second holes, and said left unitary cheek unit and said right unitary cheek unit are each surrounded by said outer housing.

2. The two-way respirator mask of claim 1, wherein said face portion further includes an inner seal.

3. The two-way respirator mask of claim 2, wherein said attachment interface includes a rigid lattice that connects at least one of said first holes and at least one of said second holes.

4. The two-way respirator mask of claim 2, further comprising a gap between said inner seal and said cheek portion, whereby said inner seal can conform to a user's face without affecting a shape of said cheek portion.

5. The two-way respirator mask of claim 1, wherein said head harness includes a cap portion connected to said straps, and configured to rest atop a user's head and to distribute tension from said straps across an area of said cap portion.

6. The two-way respirator mask of claim 1, further comprising the filter cannister, wherein the assembled respirator mask including said filter canister provides a filter efficiency of greater than 99.97% at 0.3 microns.

7. The two-way respirator mask of claim 1, further comprising the filter cannister, wherein the assembled respirator mask including said filter canister provides a filter resistance in a range of 14.0-15.0 $mmH_2O$.

8. A two-way respirator mask, comprising:

a face portion including an inner seal and an outer housing;

a cheek portion integrally formed with said outer housing, said cheek portion including an attachment interface; and a filter container attached to said face portion, said filter container configured to receive a filter cannister and including a removable cover through which air may be inhaled and exhaled;

wherein said filter container further includes an airway through which air may be inhaled through the filter cannister and exhaled through the filter cannister;

wherein said inner seal and said outer housing are manufactured from a different material than said attachment interface such that said outer housing and said inner seal are less rigid than said attachment interface, wherein said attachment interface includes a rigid lattice and a plurality of fixed holes disposed about the rigid lattice and configured to receive at least one of removable fittings or straps, and wherein said attachment interface is surrounded by said outer housing.

9. The two-way respirator mask of claim 8, wherein said outer housing is manufactured from a moldable material, which is molded to said filter container and said attachment interface.

10. The two-way respirator mask of claim 8, wherein said attachment interface is manufactured from a rigid plastic material.

11. The two-way respirator mask of claim 8, wherein said filter container is manufactured from a material that is more rigid than the material of said outer housing.

12. The two-way respirator mask of claim 8, further comprising a gap between said inner seal and said cheek portion, whereby said inner seal can conform to a user's face without affecting a shape of said cheek portion.

13. The two-way respirator mask of claim 8, further comprising a face shield removably attached to said attachment interface via removable fittings.

14. The two-way respirator mask of claim 13, further comprising a head harness removably attached to said attachment interface via straps woven through said fixed holes.

15. The two-way respirator mask of claim 8, further comprising the filter cannister, wherein the assembled respirator mask including said filter canister provides a filter efficiency of greater than 99.97% at 0.3 microns.

16. The two-way respirator mask of claim 8, further comprising the filter cannister, wherein the assembled respirator mask including said filter canister provides a filter resistance in a range of 14.0-15.0 $mmH_2O$.

17. The two-way respirator mask of claim 1, wherein the attachment interface and the filter container are separately formed from a rigid plastic material, and the outer housing connects the filter container to the attachment interface.

18. The two-way respirator mask of claim 8, wherein said inner seal and said outer housing are configured such that the inner seal is relatively more pliable than the outer housing.

19. A two-way respirator mask, comprising:

a face portion including an inner seal and an outer housing; and a filter container attached to said face portion, said filter container configured to receive a filter cannister and including a removable cover through which air may be inhaled and exhaled, wherein said filter container further includes an airway through which air may be inhaled through the filter cannister and exhaled through the filter cannister, wherein, said outer housing includes a cheek portion that extends away from said filter container and is at least partially separated from said inner seal by a gap, wherein said cheek portion includes an attachment interface including a rigid lattice and a plurality of fixed holes connected by the rigid lattice and configured to receive at least one of removable fittings or straps, and wherein said cheek portion includes a left attachment interface and a right attachment interface, said left attachment interface including a plurality of said fixed holes formed therein, and said right attachment interface including a plurality of said fixed holes formed therein, and each of the left attachment interface and the right attachment interface being surrounded by said outer housing.

* * * * *